United States Patent
Wang

(10) Patent No.: US 7,821,887 B2
(45) Date of Patent: Oct. 26, 2010

(54) METHOD AND SYSTEM FOR ADJUSTING TILT OF AN OPTICAL PICKUP HEAD

(75) Inventor: Chun-Chieh Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 324 days.

(21) Appl. No.: 12/134,158

(22) Filed: Jun. 5, 2008

(65) Prior Publication Data

US 2008/0304386 A1    Dec. 11, 2008

(30) Foreign Application Priority Data

Jun. 7, 2007    (CN) .................. 2007 1 0200785

(51) Int. Cl.
    *G11B 7/00*    (2006.01)
(52) U.S. Cl. ................. 369/44.32; 369/53.19
(58) Field of Classification Search .......... None
    See application file for complete search history.

(56) References Cited

U.S. PATENT DOCUMENTS

| 5,107,478 | A | * | 4/1992 | Tamaru et al. | 369/44.32 |
|---|---|---|---|---|---|
| 5,596,557 | A | | 1/1997 | Matsumoto | |
| 5,657,303 | A | * | 8/1997 | Namoto et al. | 369/44.32 |
| 6,167,008 | A | | 12/2000 | Kuribayashi | |
| 6,381,205 | B1 | * | 4/2002 | Fukasawa et al. | 369/53.19 |
| 6,434,096 | B1 | * | 8/2002 | Akagi et al. | 369/44.32 |
| 6,572,728 | B1 | * | 6/2003 | Bierhoff | 156/292 |
| 7,180,832 | B2 | * | 2/2007 | Kamoto et al. | 369/44.14 |
| 7,486,597 | B2 | * | 2/2009 | Urata | 369/44.32 |
| 2001/0043532 | A1 | * | 11/2001 | Tsuchinaga et al. | 369/53.19 |
| 2002/0048244 | A1 | * | 4/2002 | Kong | 369/53.19 |
| 2003/0179665 | A1 | * | 9/2003 | Iwazawa et al. | 369/44.32 |
| 2004/0057352 | A1 | | 3/2004 | Kim et al. | |
| 2004/0057362 | A1 | * | 3/2004 | Ho et al. | 369/53.19 |
| 2004/0071073 | A1 | * | 4/2004 | Toyama et al. | 369/244 |

* cited by examiner

*Primary Examiner*—Peter Vincent Agustin
(74) *Attorney, Agent, or Firm*—Frank R. Niranjan

(57) ABSTRACT

A method is used for adjusting a tilt of an optical pickup head. The method includes: identifying initial coordinates of the first static spot, the second static spot, and the dynamic spot in an image generated from three reflected light beams from the optical pickup head; turning one of the adjustable screws a predetermined calibrated rotation angle; recording current coordinates of the first static spot, the second static spot, and the dynamic spot in another image generated from three reflected light beams from the optical pickup head; calculating a total needed rotation angle of the one adjustable screw according to the initial coordinates, the predetermined calibrated rotation angle, and the current coordinates; and turning the one adjustable screw a remaining rotation angle computed by subtracting the predetermined calibrated rotation angle from the total needed rotation angle. An adjusting system is also disclosed.

8 Claims, 15 Drawing Sheets

METHOD AND SYSTEM FOR ADJUSTING TILT OF AN OPTICAL PICKUP HEAD

BACKGROUND

1. Field of the Invention

The present invention generally relates to an adjusting method and an adjusting system for adjusting the tilt of an optical pickup head.

2. Description of Related Art

In recent years, optical disk recording and/or reproducing devices have been widely used as portable electronic devices. Each optical disk recording and/or reproducing device mainly includes an optical pickup head for emitting a light beam, a guiding apparatus for movably supporting the optical pickup head, and a driving mechanic for driving the optical pickup head to move.

Referring to FIG. 12, an optical disk recording and/or reproducing device 10 is used for recording data to and/or reproducing data from an optical disk 150. In the optical disk recording and/or reproducing device 10, an optical pickup head 120 is movably supported on two guiding poles 106 (see FIG. 13), and a stepping motor 108 is used for moving the optical pickup head 120 along the guiding poles 106. When the guiding poles 106 are not in the same horizontal as each other, a tilt occurs. Even when the guiding poles 106 are parallel to each other, if the virtual plane defined by the guiding poles 106 is not parallel to the turntable 104, tilt occurs. In this case, light from the optical pickup head 120 cannot be vertically projected to the optical disk 150. The tilt of the optical pickup head 120 is a main factor influencing recording and reproducing performance of the optical disk recording and/or reproducing device 10.

Therefore, it is important to detect the tilt of the optical pickup head 120. Referring to FIGS. 13, 14, a conventional method is used to detect the tilt using a collimator 200 and three reflecting planes 132, 134, 136. The reflecting planes 132, 134, 136 are set on the turntable 104, and two ends of the guiding poles 106 respectively. In operation, the collimator 200 emits light beams, and the light beams are projected to the reflecting planes 132, 134, 136 and reflected. The reflected light beam are received and analyzed by the collimator 200, and information carried in the reflected light beams is displayed on a display screen (not shown). Referring also to FIG. 15, three light spots 42, 44, 46 are displayed in an image 40. Herein, the light spots 42, 44 are formed by the light beams reflected from the reflecting planes 134, 136, which are defined as static spots. The light spot 46 is formed by the light beam reflected from the reflecting plane 132, which is defined as dynamic spot.

If the static spots 42, 44 are both aligned in a center of the dynamic spot 46, there is no tilt. If one of the static spots deviates away from the center of the dynamic spot 46, a first displacement between a center of the one of the static spots from the center of the dynamic spot represents a first unparallel angle of the guiding poles 106 to the turntable 104. If both of the static spots deviate from the center of the dynamic spot 46, a larger displacement between the center of the dynamic spot 46 and the centers of the static spots 42, 44 represents the first unparallel angle. Herein, the center means a geometric center of a minimum virtual rectangle that can enclose a spot.

In practice, the tilt of the optical pickup head 120 is adjusted by adjustable screws on two ends of the guiding poles 106 manually according to the image 40. Therefore, the conventional adjusting method depends on skills and experiences of the person adjusting the tilt.

Therefore, improvements for an adjusting method and an adjusting system are needed in the industry to address the aforementioned deficiency.

SUMMARY

A method is used for adjusting a tilt of an optical pickup head. The method includes: recording initial coordinates of the first static spot, the second static spot, and the dynamic spot in an image generated from three reflected light beams from the optical pickup head; turning one of the adjustable screws a predetermined calibrated rotation angle; recording current coordinates of the first static spot, the second static spot, and the dynamic spot in another image generated from three reflected light beams from the optical pickup head; computing a total needed rotation angle of the one adjustable screw according to the initial coordinates, the predetermined calibrated rotation angle, and the current coordinates; and turning the one adjustable screw a remaining rotation angle computed by subtracting the predetermined calibrated rotation angle from the total needed rotation angle. An adjusting system is also disclosed.

Other advantages and novel features of the present invention will become more apparent from the following detailed description of preferred embodiment when taken in conjunction with the accompanying drawings.

DETAILED DESCRIPTION

Reference will now be made to the drawings to describe a preferred embodiment of the present adjusting method, and a preferred embodiment of the present adjusting system.

Figure 1:
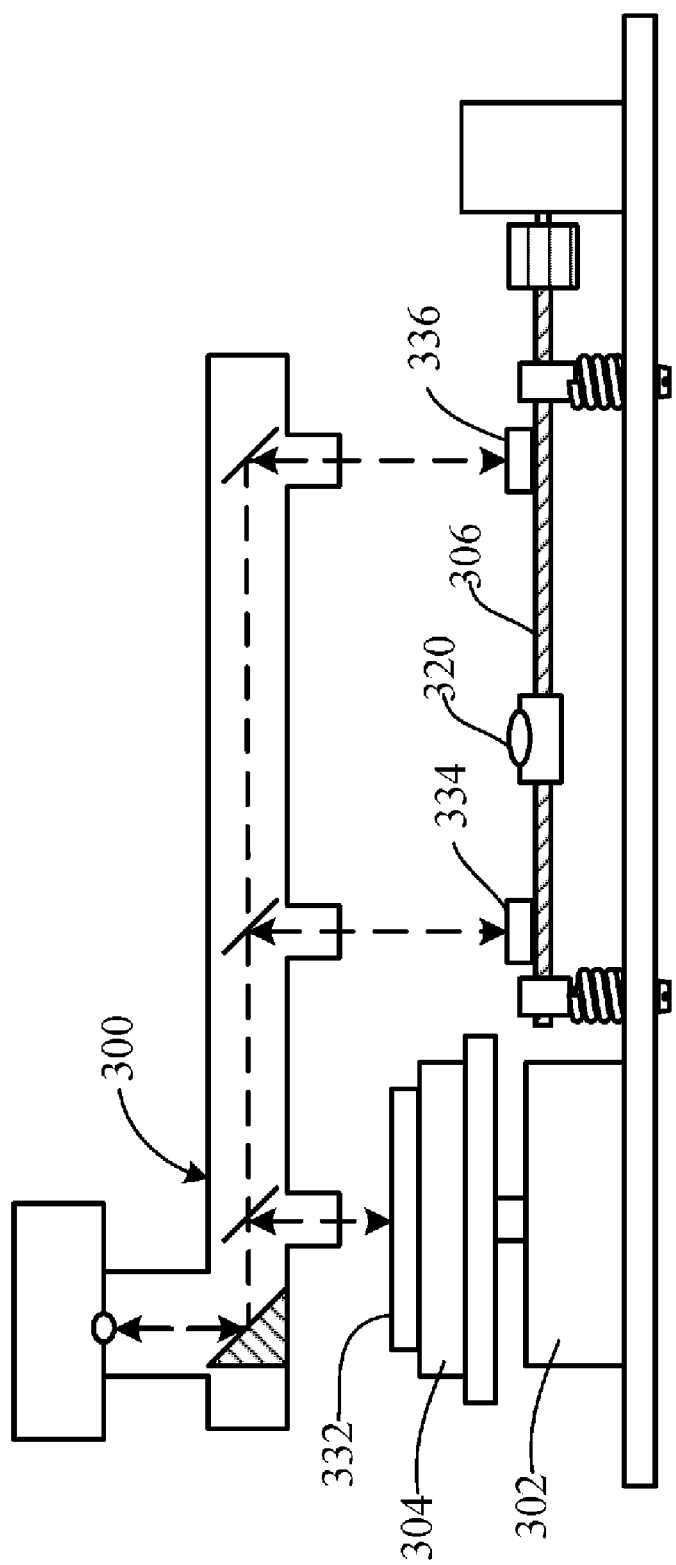
FIG. 1 is schematic diagram showing a collimator and the three reflecting planes used for detecting tilt of an optical disk recording and/or reproducing device in accordance with an exemplary embodiment.

Referring to FIG. 1, a collimator 300 and three reflecting planes 332, 334, 336 are used to detect a tilt of an optical pickup head 320 using a tilt detecting method in accordance with an exemplary embodiment. The reflecting planes 332, 334, 336 are set on a turntable 304, and two ends of a guiding pole 306 correspondingly. When operated, the collimator 300 emits light beams; the light beams are projected to the reflecting planes 332, 334, 336 and reflected back. Reflected light beams are received and analyzed by the collimator 300, and information corresponding to the reflected light beams is displayed on a display screen (not shown).

Figure 2:
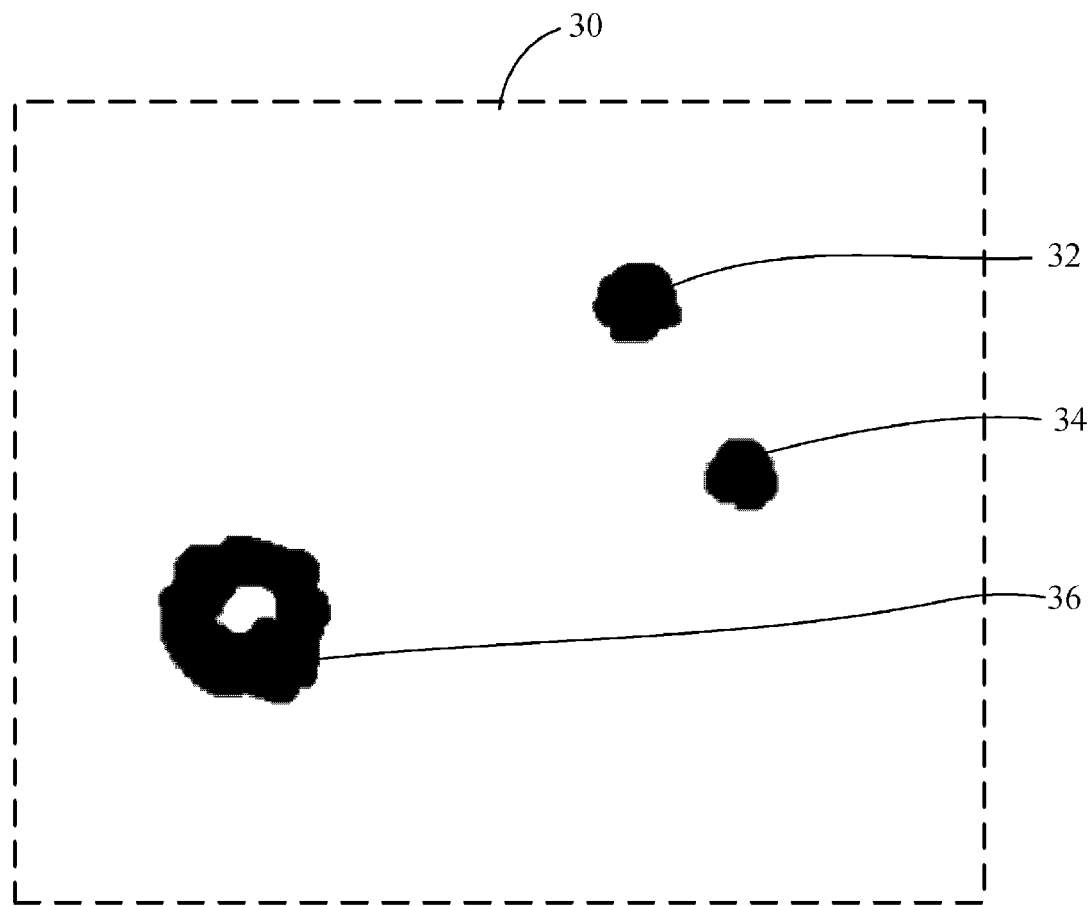
FIG. 2 is schematic diagram showing three light spots displayed in an image formed by three reflected light beams from the reflecting planes.

Referring also to FIG. 2, three light spots 32, 34, 36 are displayed in an image 30. Herein, the light spots 32, 34 are formed by the reflected light beams off the reflecting planes 334, 336, and are defined as static spots. The light spot 36 is formed by the reflected light beam off the reflecting plane 332 and is defined as a dynamic spot.

Figure 3:
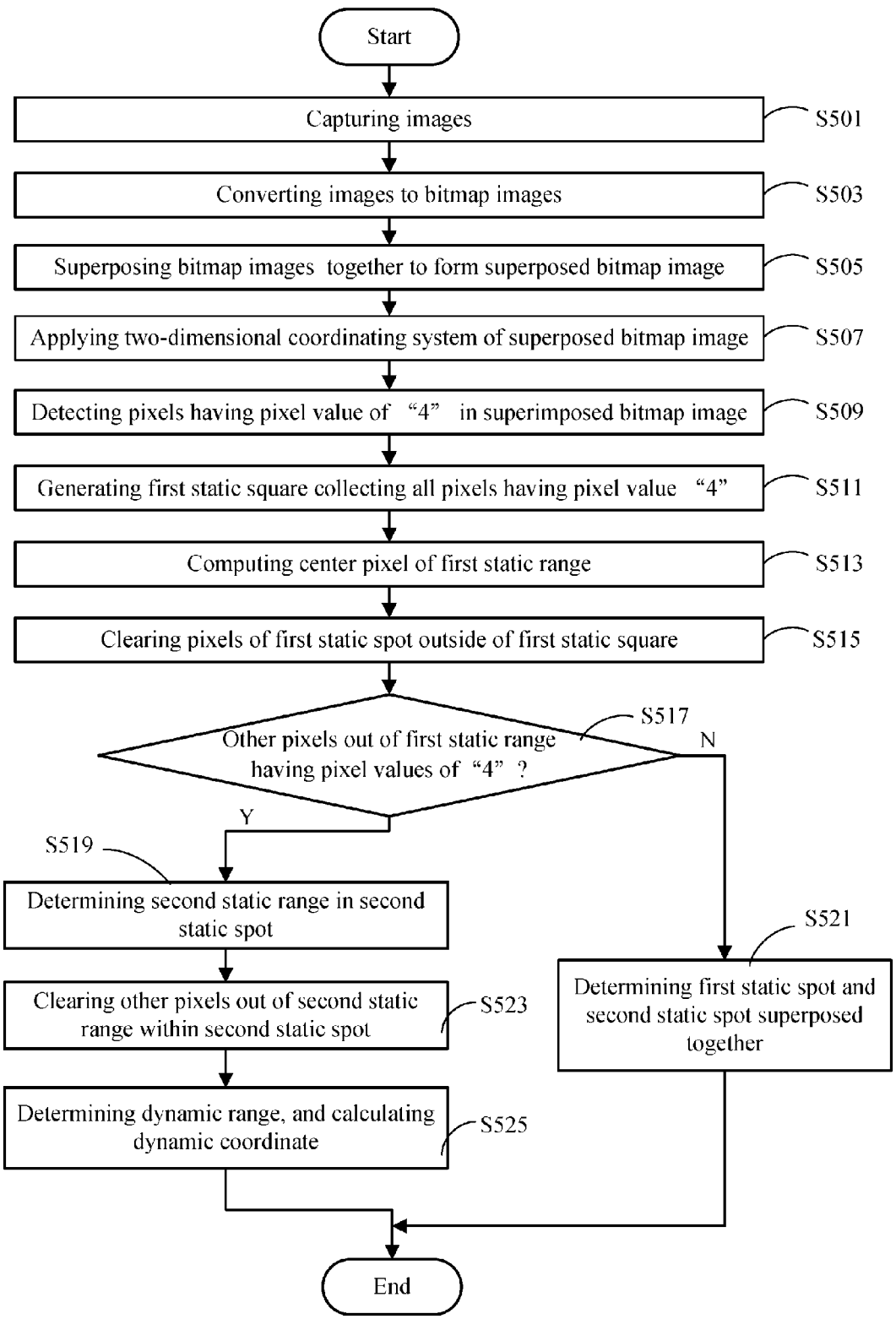
FIG. 3 is a process flow diagram showing a tilt detecting method in accordance with an exemplary embodiment.

Before adjusting the tilt of an optical pickup head 320, the tilt is first detected/measured. Referring to FIG. 3, a flow chart showing a detecting procedure of the tilt detecting method for detecting tilt of the optical pickup head 120 is illustrated. The detecting procedure includes the following steps.

Step S501, the collimator 300 captures a predetermined number of images including the static spots and the dynamic spots under the same conditions. That is, the images are taken from the collimator 300 with a same focus and a same angle. For exemplary purposes, in the preferred embodiment, the predetermined number of images is 3. However, the number of images can be any other values more than 3.

Figure 4:
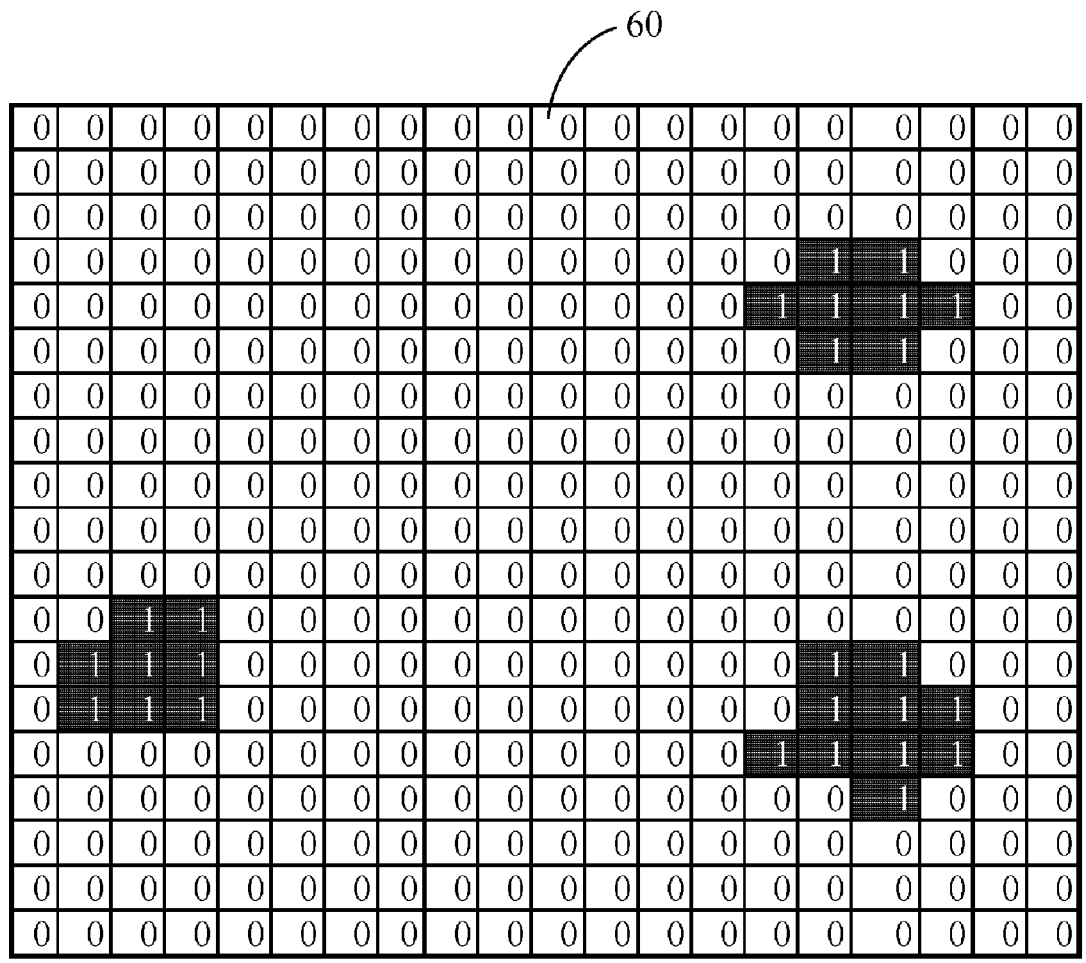
FIG. 4 is a schematic diagram showing a concrete structure of a bitmap image of static spots and a dynamic spot.

Step S503, the images are converted to bitmap images composed of pixels. Each of the pixels is represented by a pixel value. Referring to FIG. 4, an exemplary bitmap image of one of the images is shown. In the exemplary bitmap image, pixels representing a dark/shadow color, such as black, have a value of "1", and pixels representing a light/bright color have a value of "0".

Figure 5:
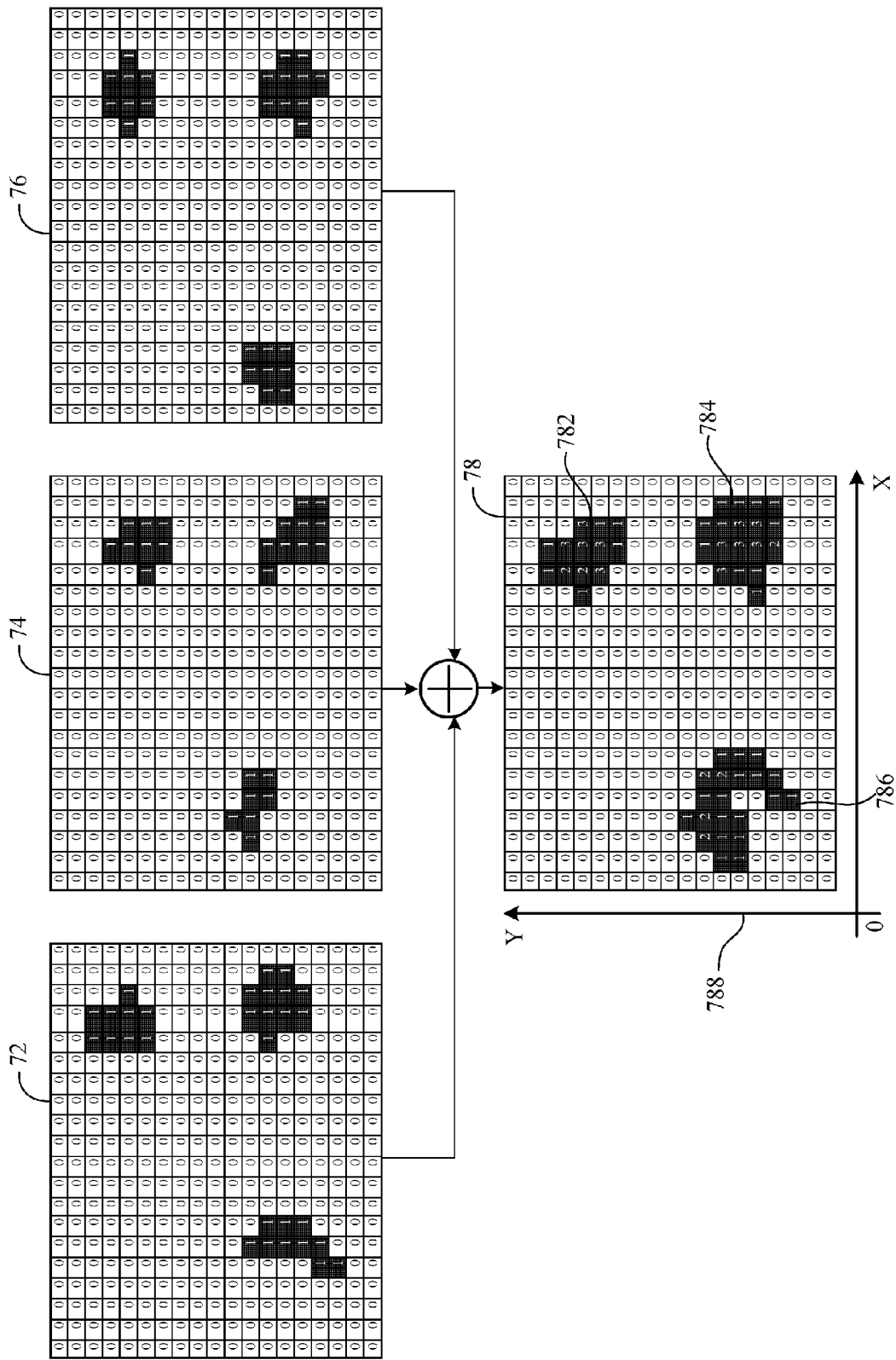
FIG. 5 is schematic diagram showing an superimposed bitmap image generated by superposing three bitmap images, and a two-dimensional coordinate system of the superimposed bitmap image.

Step S505, the bitmap images are superimposed together correspondingly to form a superimposed bitmap image. When the bitmap images are superimposed together, the pixel values of each of the predetermined number of images are correspondingly added up to generate the superimposed image. Referring to FIG. 5, a superimposed bitmap image 78 is generated by superimposing three bitmap images 72, 74, 76 together. There are three spots 782, 784, 786 in the superimposed bitmap image 78. The pixel values of the bitmap image 78 vary from a minimum value of "0" to a maximum value of "3". As seen in FIG. 5, a distribution of the maximum values of the spots 782, 784 is relatively high, therefore the spots 782, 784 are defined as concentrated spots. The static spot 782 has two pixel values of "2" and five pixel values of "3", and the static spot 784 has one pixel value of "2" and six pixel values of "3"; the static spots 782, 784 are concentrated spots. Similarly, the spot 786 is a dynamic spot, it has comparatively more small pixel values; seventeen pixel values of "1" over a large overlaid area; the dynamic spot 786 is dispersed.

Figure 6:
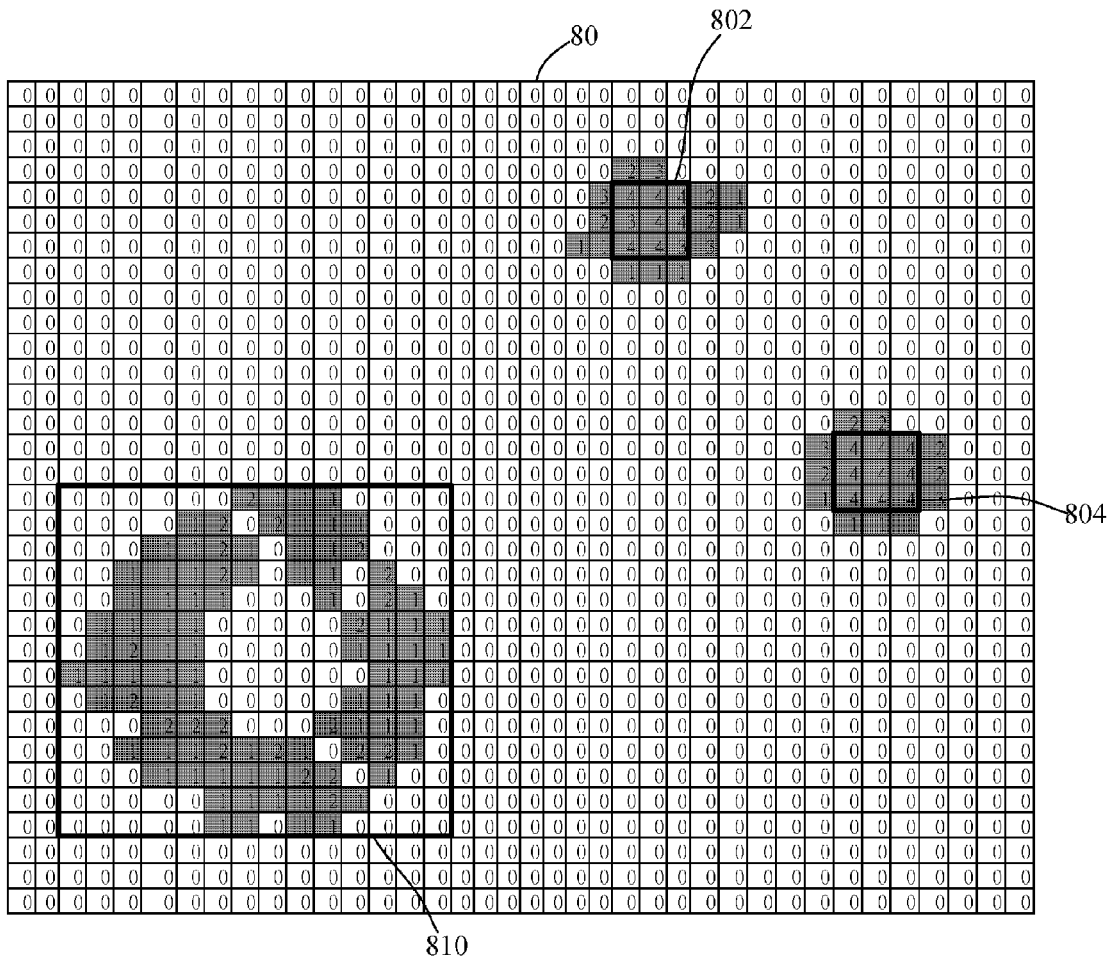
FIG. 6 is schematic diagram showing an superimposed bitmap image generated by superposing four bitmap images.

Step S507, a two-dimensional coordinate system 788 is applied on the superimposed bitmap image 78. To better explain the following steps, referring to FIG. 6, a superimposed bitmap image 80 generated by superposing four bitmap images is taken as an example.

Step S509, the superimposed bitmap image 80 is scanned to detect the pixels having pixel values of "4".

Step S511, a first static square 802 is generated and mapped onto the superimposed image by grouping all the pixels having pixel values of "4" together in a first static spot (not labeled). The first static square 802 must be a square confining all the pixels having pixel values of "4".

Step S513, a center pixel of the first static square 802 is computed, and a first coordinate of the center pixel is computed.

Step S515, the pixels of the first static spot outside of the first static square 802 are cleared, that is, set to "0".

Step S517, the superimposed bitmap image 80 is scanned to detect the pixels having pixel values of "4" outside the first static square 802.

Step S519, if the pixels have pixel value of "4" are detected outside the first static square 802, a second static square 804 is generated by selecting all the pixels with pixel value of "4" together in a second static spot (not labeled), and a second coordinate of a center pixel of the second static square 804 is computed, and the analyzing procedure goes to step S523.

Step S521, if none of the pixels outside the first static square 80 have pixel values of "4", it is determined that the first static spot and the second static spot are superposed together, a second coordinate is set to equal to the first coordinate, and the analyzing procedure goes to step S525.

Step S523, the pixels of the second static spot outside of the second static square 804 are cleared.

Step S525, the superimposed bitmap image 80 is scanned to detect a dynamic square 810 containing pixels having values "1", "2", "3" outside the first static square 802 and the second static square 804. A third coordinate of a center pixel of the dynamic square 810 is computed.

Figure 7:
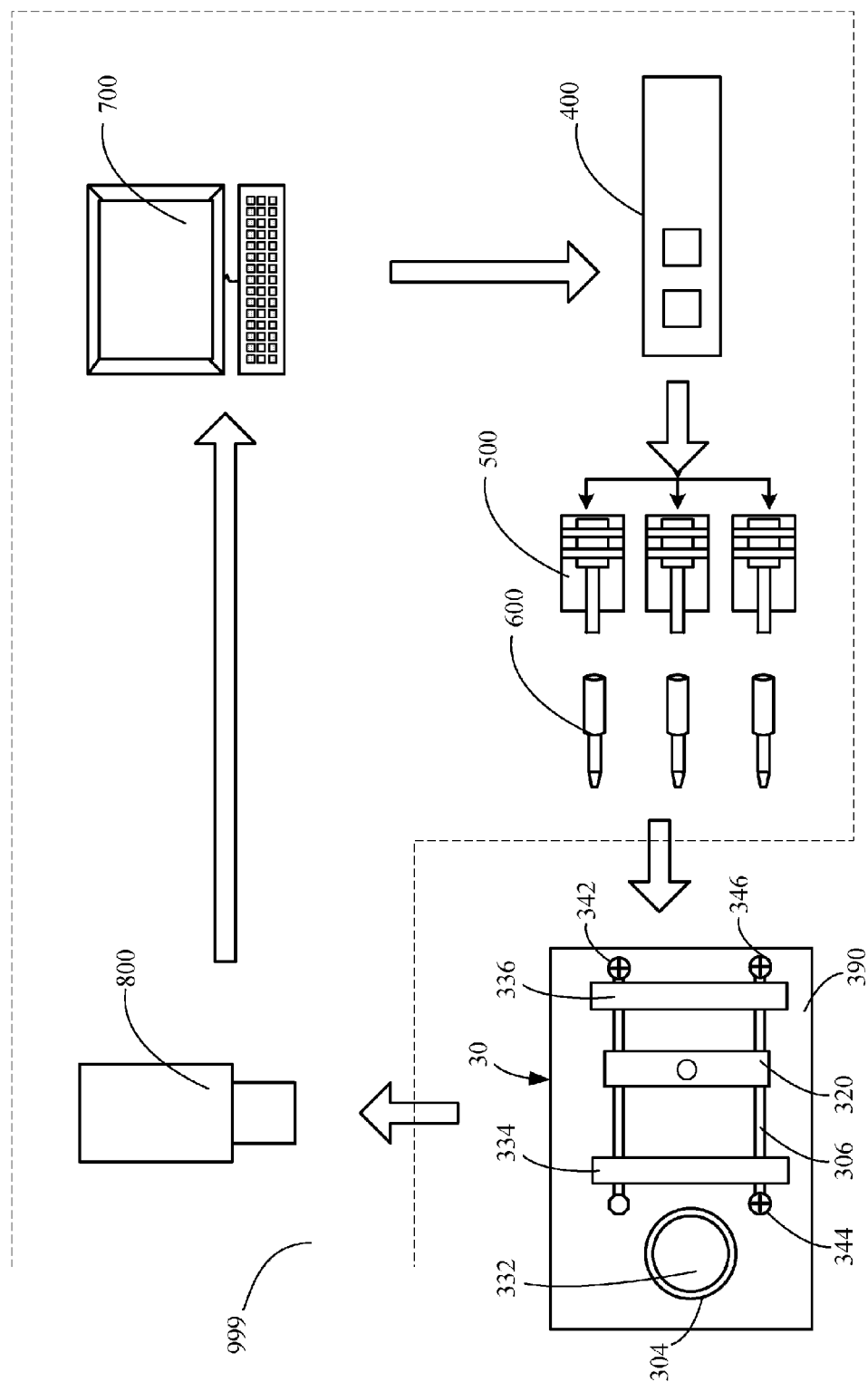
FIG. 7 is schematic diagram showing an adjusting system in accordance with an exemplary embodiment.

Referring to FIG. 7, an adjusting system 999 in accordance with an exemplary embodiment includes a controller 400, three motors 500, three drivers 600, a processing device 700, and a collimator 999. A first adjustable screw 342 adjustably attaches one end of one guiding pole 306 on a supporting board 390, and a fastener (not labeled) fixes another end of the guiding pole 306 on the supporting board 390. A second adjustable screw 344 and a third adjustable screw 346 adjustably attaches two ends of the guiding pole 306 correspondingly. The heights of the guiding poles 306 are adjusted by turning the adjustable screws 342, 344, 346 correspondingly, thus the tilt of the optical pickup head 320 is adjusted.

In operation, the collimator 800 receives reflected light beams from the reflecting planes 332, 334, 336, and analyzes the reflected light beams to obtain images and sends the images to the processing device 700, such as a computer. The processing device 700 processes the images and generates an adjust signal to the controller 400. The controller 400 controls the motors 500 to rotate the drivers 600 correspondingly according to the adjust signal. Each driver 600 turns a corresponding screw when driven by a corresponding motor 500. Therefore, the tilt of the optical pickup head 320 can be adjusted automatically by the adjusting system 999.

Figure 8:
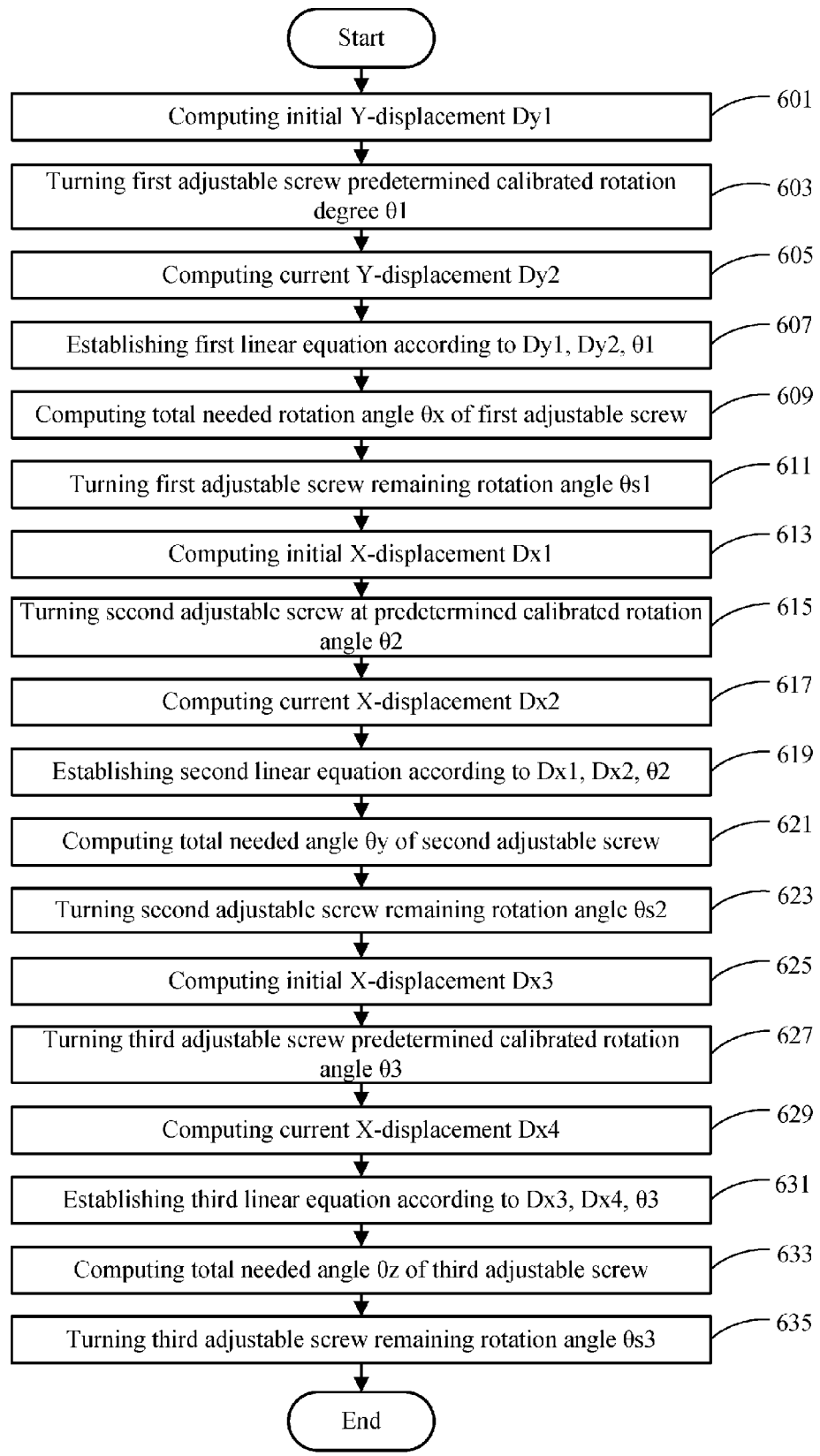
FIG. 8 is a process flow diagram showing a tilt adjusting method in accordance with an exemplary embodiment.
Figure 9:
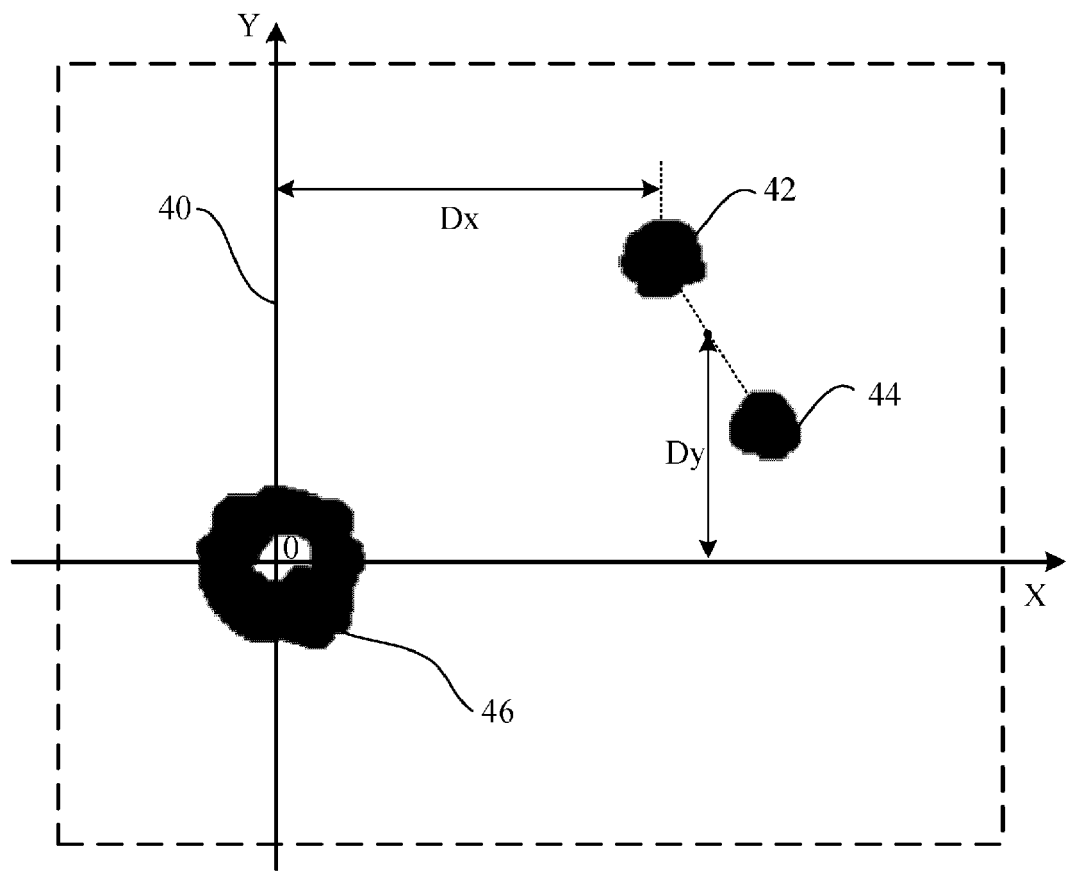
FIG. 9 is a schematic diagram showing symbols representing displacements among three light spots displayed in an image.

Referring to FIG. 8, a flow chart showing an adjusting procedure of a method for adjusting the tilt of the optical pickup head 320 is illustrated. Before explaining the adjusting procedure, referring to FIG. 9, symbols used in the adjusting procedure are defined. The original point of the coordinate system is disposed at a center point of the dynamic spot 46. Dy represents a Y-displacement from the midpoint of a straight line connecting a first static spot 42 with a second static spot 44 and the X-axis. Dx represents an X-displacement from the middle of the nearest static spot and the Y-axis. In the embodiment, the nearest static spot is the first static spot 42. A symbol θ is used to represent the rotation angle that one of the adjustable screws 342, 344, 346 is turned. The adjusting procedure includes the following steps.

Step S601, an initial Y-displacement Dy1 is computed.

Step S603, the first adjustable screw 342 is turned a predetermined calibrated rotation angle θ1.

Step S605, a current Y-displacement Dy2 is computed by receiving reflected light beams, capturing the reflected light beams to obtain an image, and processing the image.

Step S607, a first linear equation of a relationship between a changed Y-displacement Dy and a changed rotation angle θ is described as $$Dy = \frac{Dy2 - Dy1}{\theta 1} \cdot \theta + Dy1$$

according to the initial Y-displacement Dy1, the current Y-displacement Dy2, and the predetermined calibrated rotation angle θ1.

Step S609, a total needed rotation angle θx of the first adjustable screw 342 is computed as $$\theta x = \frac{Dy1 \cdot \theta}{Dy1 - Dy2}$$

according to the first linear equation. In the embodiment, the total needed rotation angle θx means the total rotation of a screw that need to be turned from an initial situation to obtain an optimal situation in which the screw need not to be turned any more.

Step S611, the first adjustable screw 342 is turned a remaining rotation angle θs1 computed as θs1 =θx−θ1.

Step S613, an initial X-displacement Dx1 of a deviation of a center point of a nearest static spot of the static spots 43, 44 from a center of the dynamic spot 46 is computed. The nearest static spot of the static spots 42, 44 is generated by a reflected light beam reflected from the reflecting plane 334.

Step S615, the second adjustable screw 344 is turned a predetermined calibrated rotation angle θ2.

Step S617, an adjusted X-displacement Dx2 is computed by receiving reflected light beams, capturing the reflected light beams to obtain an image, and processing the image.

Step S619, a second linear equation of a relationship between a changed X-displacement Dx and a changed rotation angle θ is established as $$Dx = \frac{Dx2 - Dx1}{\theta 2} \cdot \theta + Dx1$$

according to the initial X-displacement Dx1, adjusted X-displacement Dx2, and the predetermined calibrated rotation angle θ2.

Step S621, a total needed rotation angle θy of the second adjustable screw 344 is computed as $$\theta y = \frac{Dx1 \cdot \theta}{Dx1 - Dx2}$$

according to the second linear equation.

Step S623, the second adjustable screw 344 is turned a remaining rotation angle θ2 computed as θs2 =θy−θ2.

Step S625, an initial X-displacement Dx3 between a farthest static spot of the static spots 42, 44 is computed. The farthest static spot of the static spots 42, 44 is generated by a reflected light beam reflected from the reflecting plane 336.

Step S627, the third adjustable screw 346 is turned a predetermined calibrated rotation angle θ3.

Step S629, a current X-displacement Dx4 is computed by receiving reflected light beams, capturing the reflected light beams to obtain an image, and processing the image.

Step S631, a third linear equation of a relationship between a changed X-displacement Dx and a changed rotation angle θ is established as $$Dx = \frac{Dx4 - Dx3}{\theta 3} \cdot \theta + Dx3$$

according to the initial X-displacement Dx3, the current X-displacement Dx4, and the predetermined calibrated rotation angle θ3.

Step S633, a total needed rotation angle θz of the third adjustable screw 346 is computed as $$\theta z = \frac{Dx3 \cdot \theta}{Dx3 - Dx4}$$

according to the second linear equation.

Step S635, the third adjustable screw 346 is turned a remaining rotation angle θs3 computed as θs3 =θz−θ3.

As mentioned above, the adjusting procedure consists of a first sub-procedure to adjust the first adjustable screw 342, a second sub-procedure to adjust the second adjustable screw 344, and a third sub-procedure to adjust the third adjustable screw 346. Because each sub-procedure can independently adjust the tilt, thus each sub-procedure can be viewed as an independent adjusting method.

Figure 10:
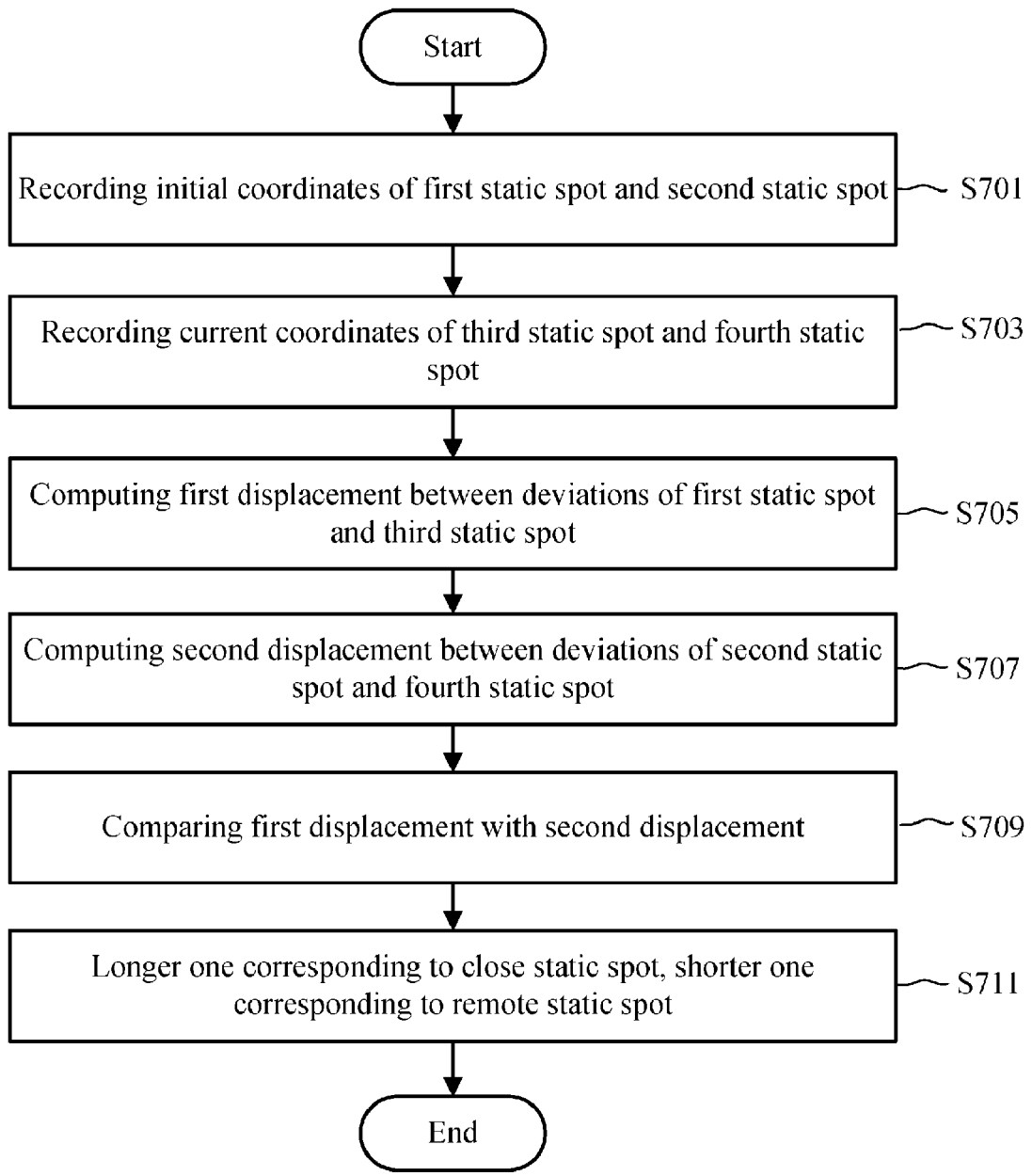
FIG. 10 is a process flow diagram showing a method for identifying a nearest static spot and a farthest static spot in accordance with an exemplary embodiment.
Figure 11:
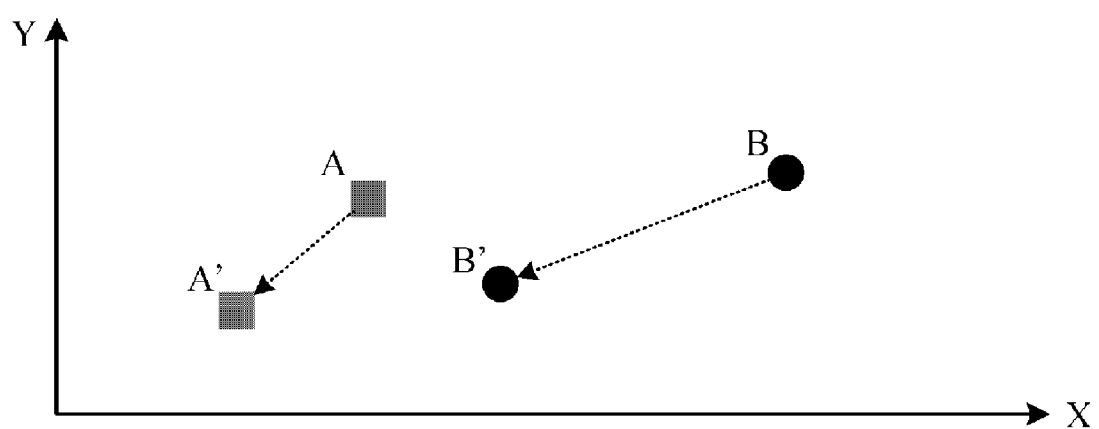
FIG. 11 is a schematic diagram showing movements and positions of static spots used in FIG. 10.
Figure 12:
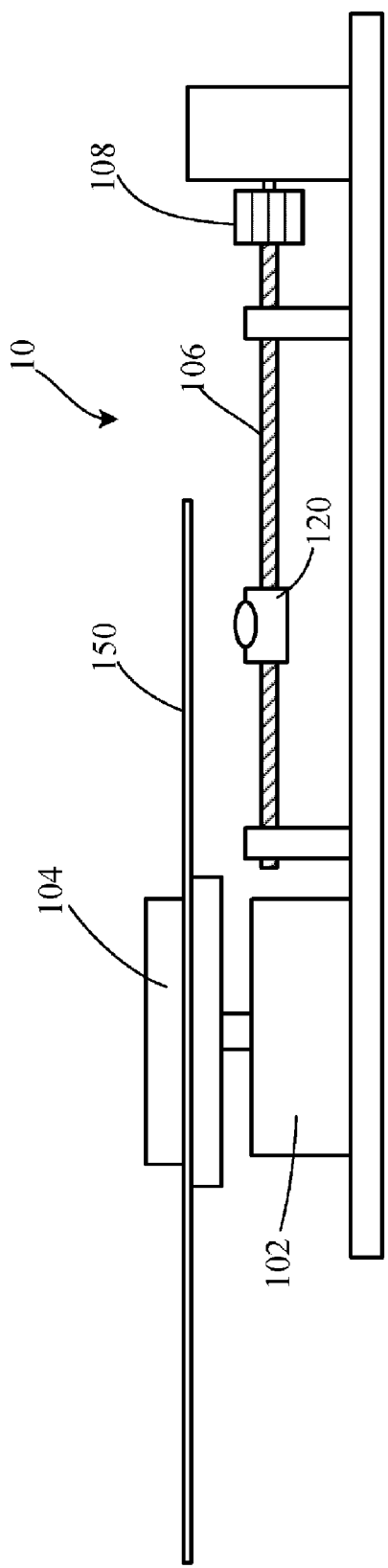
FIG. 12 is schematic diagram showing an optical disk recording and/or reproducing device.
Figure 13:
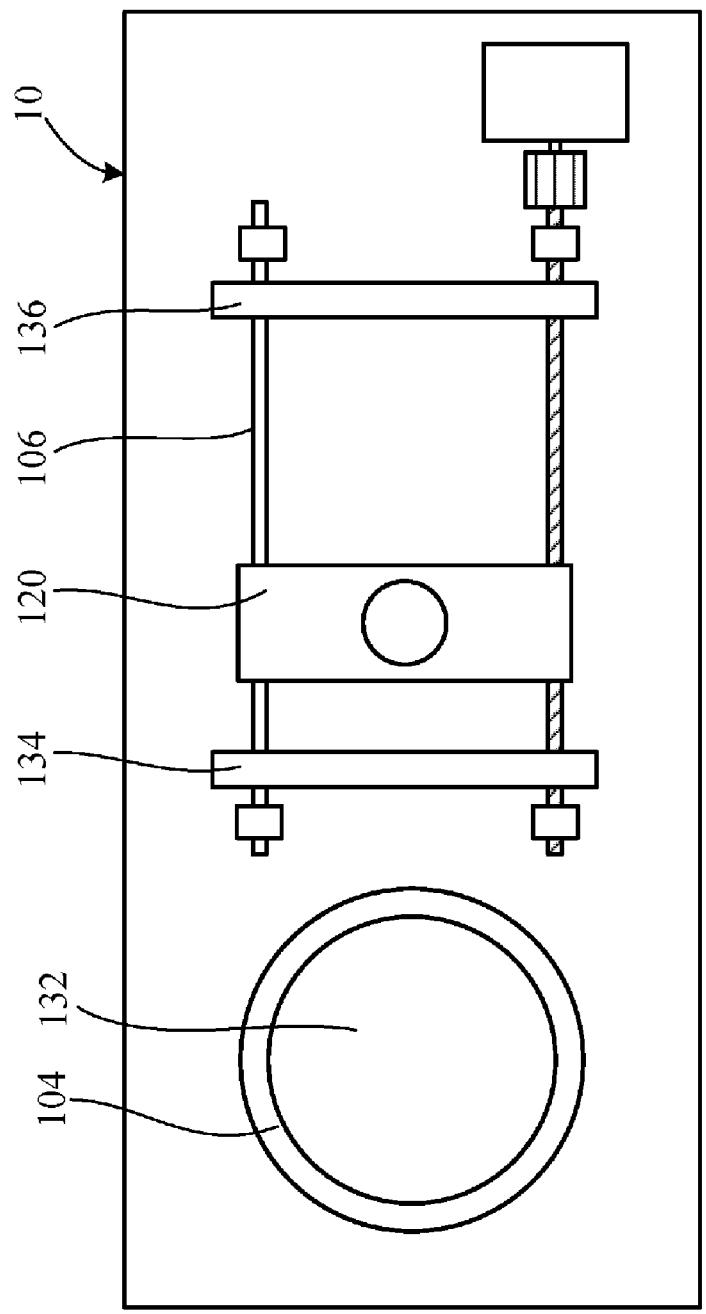
FIG. 13 is schematic diagram showing a conventional collimator and three reflecting planes used for detecting tilt of the optical disk recording and/or reproducing device of FIG. 8, viewed from an up aspect.
Figure 14:
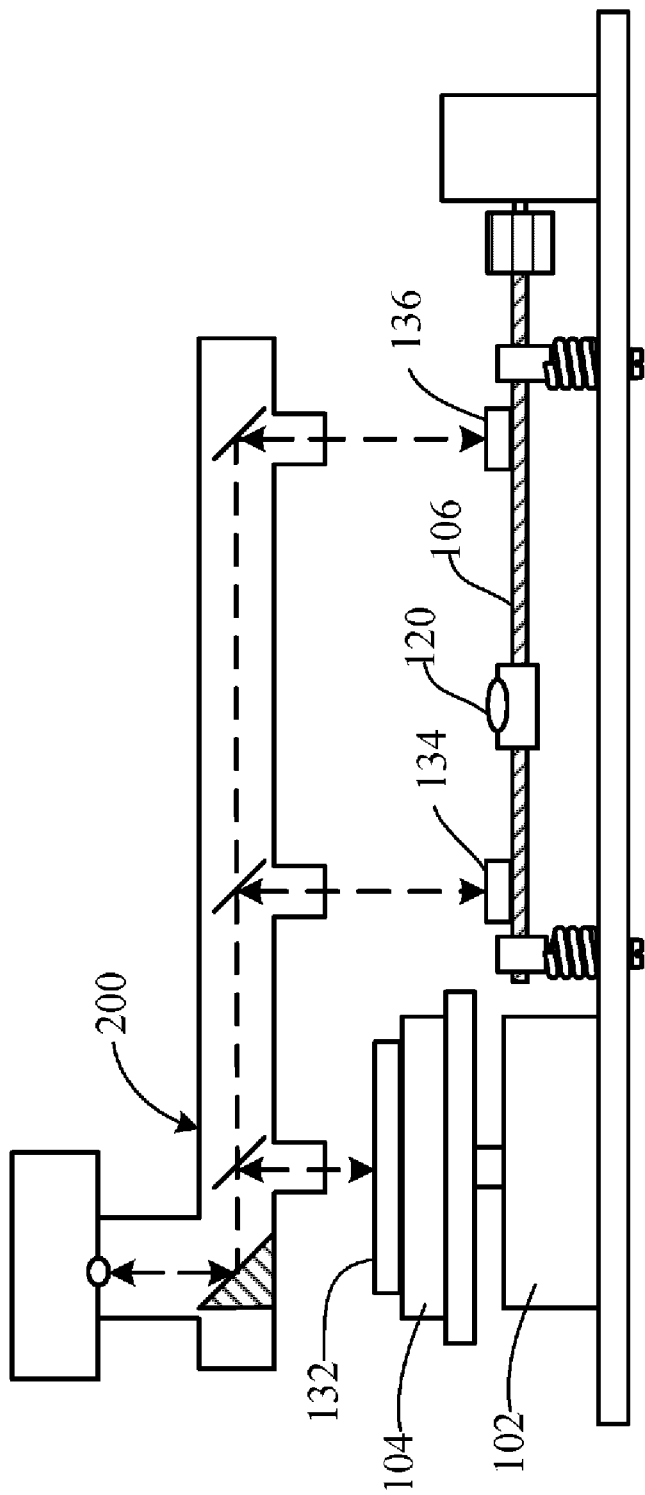
FIG. 14 is schematic diagram showing the collimator and the three reflecting planes used for detecting tilt of the optical disk recording and/or reproducing device of FIG. 8, viewed from a side aspect.
Figure 15:
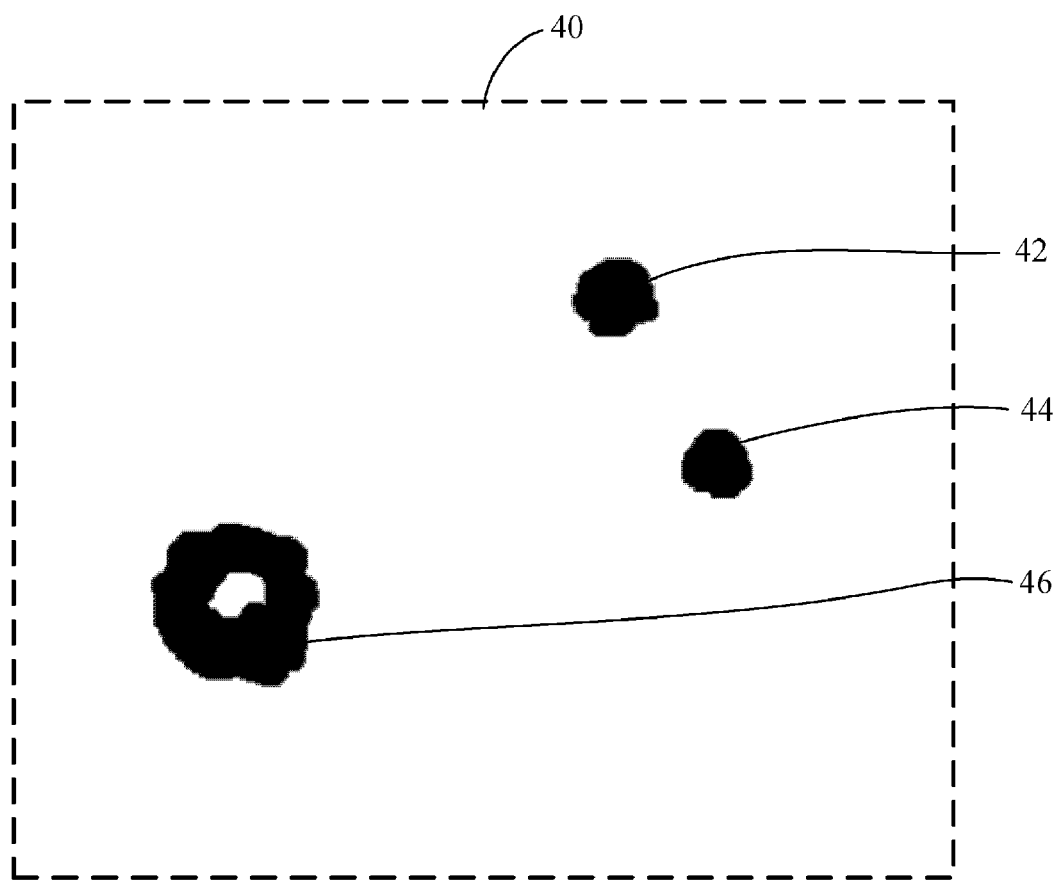
FIG. 15 is schematic diagram showing three light spots displayed in an image formed by three reflected light beams from the reflecting planes of FIG. 13.

Referring to FIGS. 10 and 11, a method for identifying the nearest static spot and the farthest static spot in the image is illustrated. An example is taken to depict the following steps of the method in adjusting the second adjustable screw 344.

Step S701, before the second adjustable screw 344 is turned the predetermined calibrated rotation angle θ2 , initial coordinates of a first static spot A and a second static spot B are recorded.

Step S703, after the second adjustable screw 344 is turned the predetermined calibrated rotation angle θ2 , current coordinates of a third static spot A' and a fourth static spot B' are recorded. The first static spot A and the third static spot A' are formed from a same reflected beam, while the second static spot B and the fourth static spot B' are formed from another same reflected beam.

Step S705, a first displacement between deviations of the first static spot A and the third static spot A' is computed.

Step S707, a second displacement between deviations of the second static spot B and the fourth static spot B' is computed.

Step S709, the first displacement is compared with the second displacement.

Step S711, within the first displacement and the second displacement, the longer one is corresponding to the nearest static spot, and the shorter one is corresponding to the farthest static spot. For example, in the embodiment, the first displacement is shorter than the second displacement, then the second static spot B and the fourth static spot B' are the nearest static spots, and the first static spot A and the third static spot A' are the farthest static spots.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for adjusting a tilt of an optical pickup head by turning adjustable screws of the optical pickup head according to an image including a first static spot, a second static spot, and a dynamic spot formed by three reflected light beams reflected from three reflecting planes respectively, the method comprising:
    recording initial coordinates of the first static spot, the second static spot, and the dynamic spot in an image generated from three reflected light beams from the optical pickup head;
    turning one of the adjustable screws a predetermined calibrated rotation angle $\theta 1$;
    recording current coordinates of the first static spot, the second static spot, and the dynamic spot in another image generated from three reflected light beams from the optical pickup head;
    computing a total needed rotation angle of the one adjustable screw according to the initial coordinates, the predetermined calibrated rotation angle, and the current coordinates; and
    turning the one adjustable screw a remaining rotation angle computed by subtracting the predetermined calibrated rotation angle from the total needed rotation angle.

2. The method according to claim 1, wherein the optical pick-up head comprising a first adjustable screw, a second adjustable screw, and a third adjustable screw, and the method further comprising:
    computing an initial Y-displacement Dy1 along the Y-axis between the dynamic spot and a midpoint of a straight line connecting the first static spot with the second static spot;
    turning the first adjustable screw the predetermined calibrated rotation angle $\theta 1$;
    computing a current Y-displacement Dy2 along the Y-axis between the dynamic spot and a midpoint of a straight line connecting the first static spot with the second static spot;
    establishing a first linear equation as $$Dy = \frac{Dy2 - Dy1}{\theta 1} \cdot \theta + Dy1,$$

wherein Dy and $\theta$ are variables;
    computing a total needed rotation angle $\theta x$ of the first adjustable screw as $$\theta x = \frac{Dy1 \cdot \theta}{Dy1 - Dy2}$$

according to the first linear equation;
    turning the first adjustable screw a remaining rotation angle $\theta s1$ computed as $\theta s1 = \theta x - \theta 1$.

3. The method according to claim 2, further comprising:
    computing an initial X-displacement Dx1 between a dynamic spot and a nearest static spot of the first static spot and the second static spot, wherein the nearest static spot is generated by a reflected light beam reflected from a reflecting plane set nearer to the optical pick-up head;
    turning the second adjustable screw a predetermined calibrated rotation angle $\theta 2$;
    computing a current X-displacement Dx2;
    establishing a second linear equation as $$Dx = \frac{Dx2 - Dx1}{\theta 2} \cdot \theta + Dx1,$$

wherein Dx and $\theta$ are variables;
    computing a total needed rotation angle $\theta y$ of the second adjustable screw as $$\theta y = \frac{Dx1 \cdot \theta}{Dx1 - Dx2}$$

according to the second linear equation;
    turning the second adjustable screw a remaining rotation angle $\theta s2$ computed as $\theta s2 = \theta y - \theta 2$.

4. The method according to claim 2, further comprising:
    computing an initial X-displacement Dx3 between a farthest static spot of the first static spot and the second static spot, wherein the farthest static spot is generated by a reflected light beam reflected from a reflecting plane set farther to the optical pick-up head;
    turning the third adjustable screw a predetermined calibrated rotation angle $\theta 3$;
    computing a current X-displacement Dx4;
    establishing a third linear equation as $$Dx = \frac{Dx4 - Dx3}{\theta 3} \cdot \theta + Dx3,$$

wherein Dx and $\theta$ are variables;
    computing a total needed rotation angle $\theta z$ of the second adjustable screw as $$\theta z = \frac{Dx3 \cdot \theta}{Dx3 - Dx4}$$

according to the second linear equation;
    turning the second adjustable screw a remaining rotation angle $\theta s3$ computed as $\theta s3 = \theta z - \theta 4$.

5. The method according to claim 2, further comprising:

turning the second adjustable screw a predetermined calibrated rotation angle θ2;

recording current coordinates of the first static spot and the second static spot;

computing a first displacement between the initial coordinates of the first static spot and the current coordinates of the first static spot;

computing a second displacement between the initial coordinates of the second static spot and the current coordinates of the second static spot;

comparing the first displacement with the second displacement;

determining that the first static spot is a nearest static spot and the second static spot is a farthest static spot if the first displacement is longer than the second displacement.

6. The method according to claim 5, further comprising:

determining that the first static spot is the farthest static spot and the second static spot is a nearest static spot if the first displacement is shorter than the second displacement.

7. The method according to claim 1, further comprising:

capturing a plurality of images including corresponding static spots and a corresponding dynamic spot;

converting the images to bitmap images;

superimposing the bitmap images to form a superimposed bitmap image including the first static spot, the second static spot, and the dynamic spot.

8. The method according to claim 7, further comprising:

applying a two-dimensional coordinate system on the superimposed bitmap image to define the coordinates of the first static spot, the second static spot, and the dynamic spot.

* * * * *